(12) United States Patent
Daniel

(10) Patent No.: US 6,272,549 B1
(45) Date of Patent: Aug. 7, 2001

(54) METHOD FOR USING ELECTRONIC MAIL FOR EXCHANGING DATA BETWEEN COMPUTER SYSTEMS

(75) Inventor: Robert S. Daniel, Ft. Collins, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/085,604

(22) Filed: May 27, 1998

(51) Int. Cl.⁷ .................................................. G06F 15/16
(52) U.S. Cl. ...................... 709/246; 709/206; 709/218; 709/219; 709/229; 709/247
(58) Field of Search .................... 709/219, 229, 709/206, 247, 246, 218

(56) References Cited

U.S. PATENT DOCUMENTS

| | | | |
|---|---|---|---|
| 5,136,291 | * 8/1992 | Teague | 709/246 |
| 5,673,322 | * 9/1997 | Pepe et al. | 709/219 |
| 5,710,883 | * 1/1998 | Hong et al. | 709/246 |
| 5,912,697 | * 6/1999 | Hashimoto et al. | 709/219 |

OTHER PUBLICATIONS

Freed & Borenstein (Multipurpose Internet Mail Extensions, Nov. 1996.)*
Jonathan B. Postel (Simple Mail Transfer Protocol, Nov. 1981).*
Freed & Borenstein (Multipurpose Internet Mail Extensions, Nov. 1996).*
Johathan B. Postel (Simple Mail Transfer Protocol, Nov. 1981).*
Comer, Douglas E. and Stevens, David L., *Internetworking with TCP/IP Volume II Design, Implementation, and Internals*, Prentice–Hall, Inc. 1994, Chapters 11, 12, 13, pp. 191–268.

* cited by examiner

Primary Examiner—Dung C. Dinh
Assistant Examiner—Chuong Ho

(57) ABSTRACT

A TCPEmail system that builds an additional TCP/IP protocol layer on top of an electronic mail system. An application program uses TCPEmail in the conventional manner of using TCP/IP. The application program calls TCPEmail and passes the data to be sent. TCPEmail breaks the data into packets, converts them into ASCII format, and sends the packets as a conventional electronic mail messages. When an electronic mail message is received the data in the mail message is converted into a binary data packet, combined with other packets, and sent to the application.

15 Claims, 8 Drawing Sheets

METHOD FOR USING ELECTRONIC MAIL FOR EXCHANGING DATA BETWEEN COMPUTER SYSTEMS

FIELD OF THE INVENTION

This invention relates to computer systems and more particularly to the TCP/IP protocol for exchanging data between computer systems. Even more particularly, the invention relates to using electronic mail to enhance TCP/IP in exchanging data between computer systems.

BACKGROUND OF THE INVENTION

Data is often exchanged between two computer systems, particularly over the internet, using the Transmission Control Protocol/Internet Protocol (TCP/IP). TCP/IP is integrated into the OSI reference model for networks wherein TCP performs the transport layer function and IP performs the network layer function. Because TCP/IP is a part of the normal network software contained within a computer system, direct use of TCP/IP will usually penetrate the firewall established for the computer system. Because of this, most computer systems are set up to not allow the direct use of TCP/IP within their computer systems, except for certain well known applications such as electronic mail, thus to avoid the penetration of the firewall by an unknown and untested application.

When communicating between computer systems, one can accept the penetration of the firewall and use TCP/IP directly, or find another solution which does not penetrate the firewall. One such solution is to use dial-up modems to establish a point-to-point link between the two computers. With this type of connection no other computer systems could attach to the link, therefore, there is no possibility of penetrating the firewall within either computer system. Using modems, however, increases the cost of the is connection, because of the additional cost of the modems plus the costs of the long distance telephone charges for each connection, when the connection is not a local connection. Using dial-up modems also increases the complexity of the connection, because of the necessity to either manually dial the telephone to make the connection, or provide software that performs the dialing and connecting processes, in addition to the original communication process.

Another problem with the prior art use of TCP/IP is that not all computer systems have this protocol available. If this protocol is not available on a computer system, then obviously it cannot be used to communicate with another computer system.

There is need in the art then for a communications system between two computers that avoids the complexity and costs of dial-up connections, while also avoiding the firewall penetration problems caused by direct TCP/IP connections. Still another need is for such a communications system that does not rely on TCP/IP being present in a computer system. The present invention meets these and other needs in the art.

SUMMARY OF THE INVENTION

It is an aspect of the present invention to perform the functions of the TCP/IP protocol using electronic mail.

It is another aspect of the invention to use existing TCP programming while replacing the IP programming with calls to an electronic mail server.

Yet another aspect of the invention is to perform the protocol while executing within a user address space.

Still another aspect of the invention is to convert data between binary and ASCII, so that only ASCII is sent through electronic mail.

The above and other aspects of the invention are accomplished in a TCPEmail system that builds an additional TCP/IP protocol layer on top of an electronic mail system. Although the electronic mail system may use the conventional TCP/IP protocol to communicate between computers, and thus, penetrates the firewall, e-mail is a commonly accepted process and is allowed to penetrate the firewall in most computer systems. Many corporations today severely limit the exchange of TCP/IP traffic but place little or no restrictions on electronic mail, so TCPEmail can connect processes that would otherwise not be able to make use of interprocess communication.

An application program that wishes to communicate to another computer uses TCPEmail in the conventional manner of using TCP/IP, except that TCPEmail runs within the user address space, rather than the system address space where the conventional TCP/IP process runs. Because the TCPEmail process runs in user address space, the process must allocate its own memory from the user space and manage the use of the allocated memory.

When an application program wishes to send data through TCPEmail, it calls TCPEmail and passes it the data to be sent. The TCP process within TCPEmail breaks the data into packets and calls the IP process within TCPEmail to send each of these packets. The IP portion of TCPEmail receives the packet, converts it into ASCII format, since binary data cannot be transmitted through electronic mail, and then calls the electronic mail system to send the packet as a conventional electronic mail message.

When an electronic mail message is received by TCPEmail, it converts the ASCII data within the mail message into a binary data packet, and sends this packet to the TCP portion of TCPEmail as a conventional TCP packet. The TCP portion of the TCPEmail system combines the packets from several messages, and delivers the data to the application as received data. Because TCPEmail uses standard electronic mail to send and receive data, and because standard electronic mail is typically slower than communications that directly use TCP/IP, the time-outs for receiving acknowledgments of packets sent must be extended when using TCPEmail.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
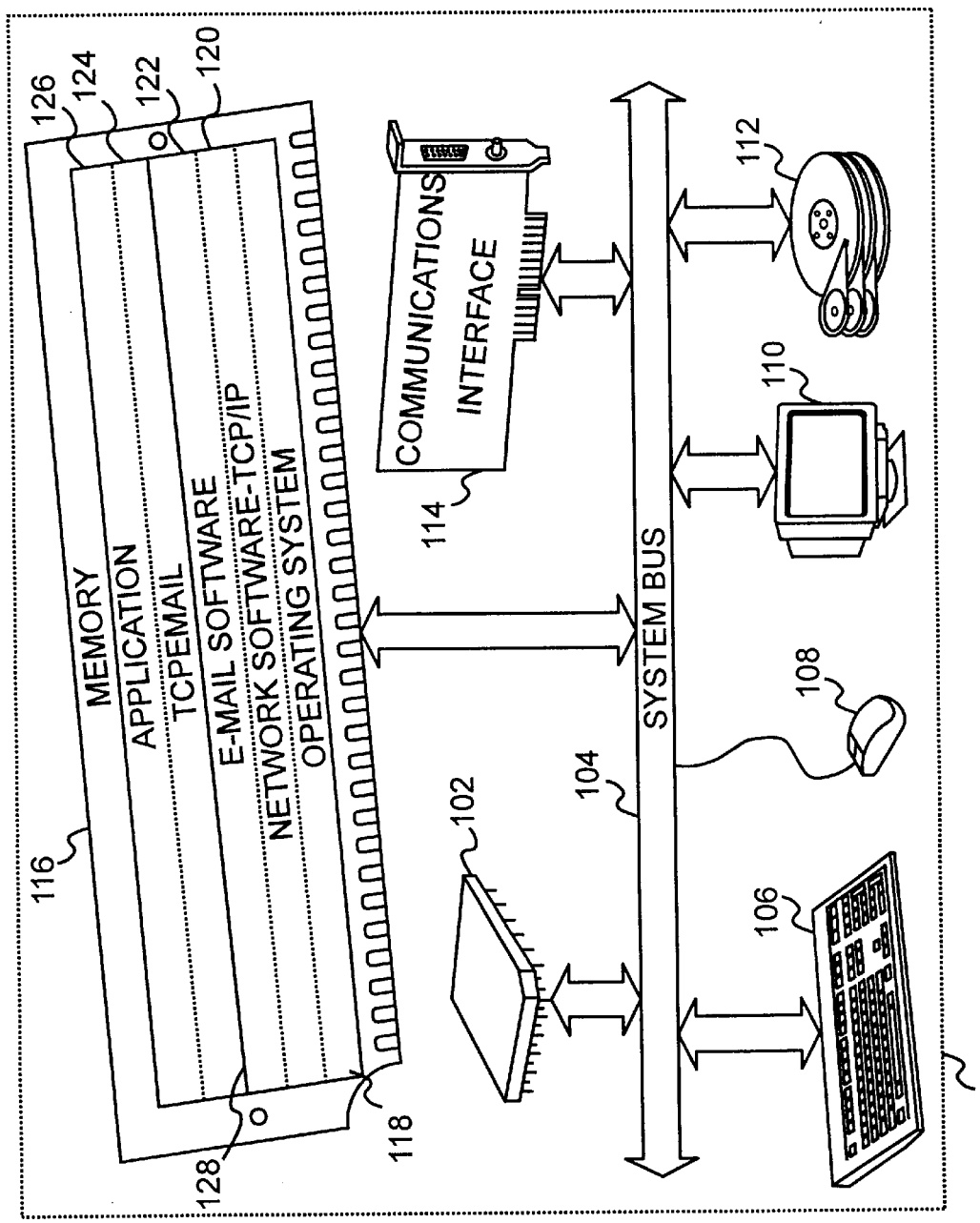
FIG. 1 shows a block diagram of a computer system containing the present invention.

FIG. 1 shows a block diagram of a computer system containing the present invention. Referring now to FIG. 1, a computer system 100 contains a processing element 102 which communicates to other elements of the computer system 100 over a system bus 104. A keyboard 106 is used for text input to the computer system 100 and a mouse pointer device 108 is used for graphical input to the computer system 100. A display 110 is used to output text and data to a user of the computer system 100, and a disk 112 is used to store data and software of the present invention within the computer system 100. A communications interface 114 allows the computer system 100 to communicate to other computer systems, for example through intranets or the internet.

A memory 116 is attached to the system bus 104, and contains the software of the present invention as well as other conventional software used by the computer system 100. An operating system 118, typically the Unix® Operating System, is used to directly communicate to the other devices attached to the system bus 104. Network software-TCP/IP 120 is used for communications within the internet as well as communication over any type of network that might be used by the computer system 100. Electronic mail software 122 uses the network software-TCP/IP to send electronic mail to other computer systems.

The line 128 divides the memory 116 into system address space, which contains the email software 122, network software-TCP/IP 120, and the operating system 118, and user address space, which contains TCPEmail software 124 and application software 126.

The present invention uses a portion of the TCP process described in "Internetworking with TCP/IP Volume 2 Design, Implementation, and Internals" of Douglas E. Comer and David L. Stevens, published by Prentice-Hall, Copyright 1994. The code for this process is also shown in Appendix A attached hereto, and incorporated herein by reference. One difference between the TCP process described in the Comer and Stevens book, and the present invention, in that the present invention uses electronic mail for sending and receiving packets, and since electronic mail is slower than the conventional TCP/IP process, the present invention must use longer time-outs for the time allowed to receive an acknowledgment of a packet after the packet is sent.

The Comer and Stevens implementation of TCP runs in the kernel of an operating system called XINU, which is documented in the textbook "Operating System Design" volumes 1 and 2, Douglas E. Comer, published by Prentice-Hall. Since the present invention runs TCP in user space, the XINU calls are emulated using unix system calls. There are several modules each of which provides one of the following services:

memory management process management semaphores ports queues

There are five cooperating processes:

The main process, which controls the others. It is a process started by the application. It does not have to run as a separate process from the application. It is the process that calls the XINU API (XINUinit, XINUopen, XINUwrite, etc.). This process is described below with respect to FIG. 5.

TCPEMAIL SEND, the output process, responsible for packet transmission. It is started by the TCPEMAIL PROCESS. This process is described below with respect to FIG. 6.

TCPEMAIL RECEIVE, responsible for receiving packets delivered by the electronic mail system. This is actually a series of processes, one for each packet received. It is started by the electronic mail system, and exits after a packet has been received and handed off to the TCPEMAIL PROCESS. This process is described below with respect to FIG. 7.

TCPEMAIL PROCESS, responsible for receiving data from the application, sub-dividing it into packets and sending each packet to TCPEMAIL SEND. Also responsible for receiving incoming packets from the TCPEMAIL RECEIVE process, combining the packets and delivering the combined packets to the application. This process is taught in Comer and Stevens and is not further described herein.

TCPTIMER, responsible for scheduling events such as retransmission of unacknowledged packets. This process is taught in Comer and Stevens and is not further described herein.

The Comer and Stevens implementation runs in the XINU kernel. The XINU kernel has a concept of independently running processes, but all of the kernel processes share a common address space. To emulate this, the present invention uses shared memory. This is the responsibility of the module referred to above as "memory management." This module allocates and deallocates pieces of a pool of shared memory; it initializes this shared memory pool; and attaches the shared memory pool to each of the TCPEmail processes. The operations provided by the memory management module are:

shmalloc—allocate shared memory shmfree—deallocate shared memory miscellaneous initialization and cleanup operations The process management facility starts up each process and keeps track of its pid (Process Id). Tracking the pid is needed so that the processes can be terminated gracefully and cleaned up. Also TCPEmail must respond appropriately to SIGCLD interrupts, which occur when a process terminates, and the appropriate response depends on whether the child process that terminated is one of the XINU processes (TCPEMAIL PROCESS, TCPEMAIL SEND, TCPEMAIL RECEIVE, and tcptimer) or another process, such as one forked by an application server to handle a connection request from a client. If one of the XINU processes terminates, the appropriate response is to kill the rest of the XINU processes and clean up. If the terminating process is not one of the XINU processes, the appropriate response depends on the application. It is the job of process management to distinguish between child processes that are XINU processes and those that are not. The process management module provides the operations:

scheduler_start_proc scheduler_isit_xinu—distinguish between XINU processes and non—XINU processes scheduler_kill_all—send a signal to all XINU processes miscellaneous initialization and cleanup operations The five cooperating processes are synchronized via semaphores. This is the responsibility of the module referred to as "semaphores" in the list above. Ports and queues also make use of semaphores. The semaphore module provides the operations:

XINUscreate—create a semaphore

XINusdelete—delete a semaphore

XINUscount—return the semaphore count

XINUsignal—increment the semaphore count and wake up a process or processes waiting on the semaphore XINUwait—decrement the semaphore count and wait for it to become non-zero miscellaneous initialization and cleanup operations.

These modules use the same design as Comer and Stevens, but have been changed to work in user space.

Ports, also called sockets, are the mechanism used for passing pseudo-ip packets between the cooperating processes. When the TCPEMAIL RECEIVE process receives an email from the electronic mail system, it decodes it into a (binary) TCP packet and sends it to the TCPEMAIL PROCESS inbound port. It is removed from this port by the TCPEMAIL PROCESS, which in normal processing puts its contents into the appropriate receive buffer, from which the application can read via the XINUread call. The TCPEMAIL SEND process takes outbound packets out of the TCPE-MAIL PROCESS outbound port and sends them off via the electronic mail system. Conceptually, a port is a FIFO array of pointers. Access to it is controlled by semaphores. If the array is full, a process attempting to send to it is blocked until space becomes available. A process attempting to read from an empty port is blocked until an item is deposited into the port. Multiple processes may read and write the port simultaneously, and it is also the responsibility of the port module to synchronize concurrent access. The ports module provides the following operations:

pcreate—create a port pdelete—delete a port psend—send a message to a port preceive—receive a message from a port pcount—count the messages waiting in a port miscellaneous initialization and cleanup operations These modules use the same design as Comer and Stevens, but have been changed to work in user space.

Queues are similar to ports. Operations provided by the queue module:

newq—create a queue free—delete a queue ctq—count items in a queue enq—place an item into a queue deq—remove an item from a queue miscellaneous initialization and cleanup operations These modules use the same design as Comer and Stevens, but have been changed to work in user space.

The interface to TCPEmail is a set of procedure calls implemented in ANSI C. The core set of procedure calls are similar to BSD sockets calls. The BSD socket calls and the corresponding XINU calls are shown in the table below:

| BSD | TCPEmail |
|---|---|
| socket () | XINUopen () |
| connect () | XINUcontrol () |
| accept () | XINUcontrol () |

-continued

| BSD | TCPEmail |
|---|---|
| read () | XINUread () |
| write () | XINUwrite () |
| close () | XINUclose () |

In addition to the XINU calls above, there are several that have no counterpart in BSD sockets:

XINUinit()

XINUexit()

XINUcld()

These calls are for initializing and starting the XINU equivalent processes, and for shutting them down. These are functions that are done by the operating system in the normal TCP/IP environment, but since TCPEmail runs in user space they must be called explicitly by users of TCPEmail.

XINUcld() is a facility provided by TCPEmail for handling the SIGCLD signal. Applications that use TCPEmail should catch SIGCLD and call XINUcld() from their SIG-CLD interrupt handling routine. XINUexit() may be called upon normal termination. It should also be called by any signal handler that terminates the application, because TCPEmail uses system resources that will not be cleaned up unless XINUexit is called.

Figure 2:
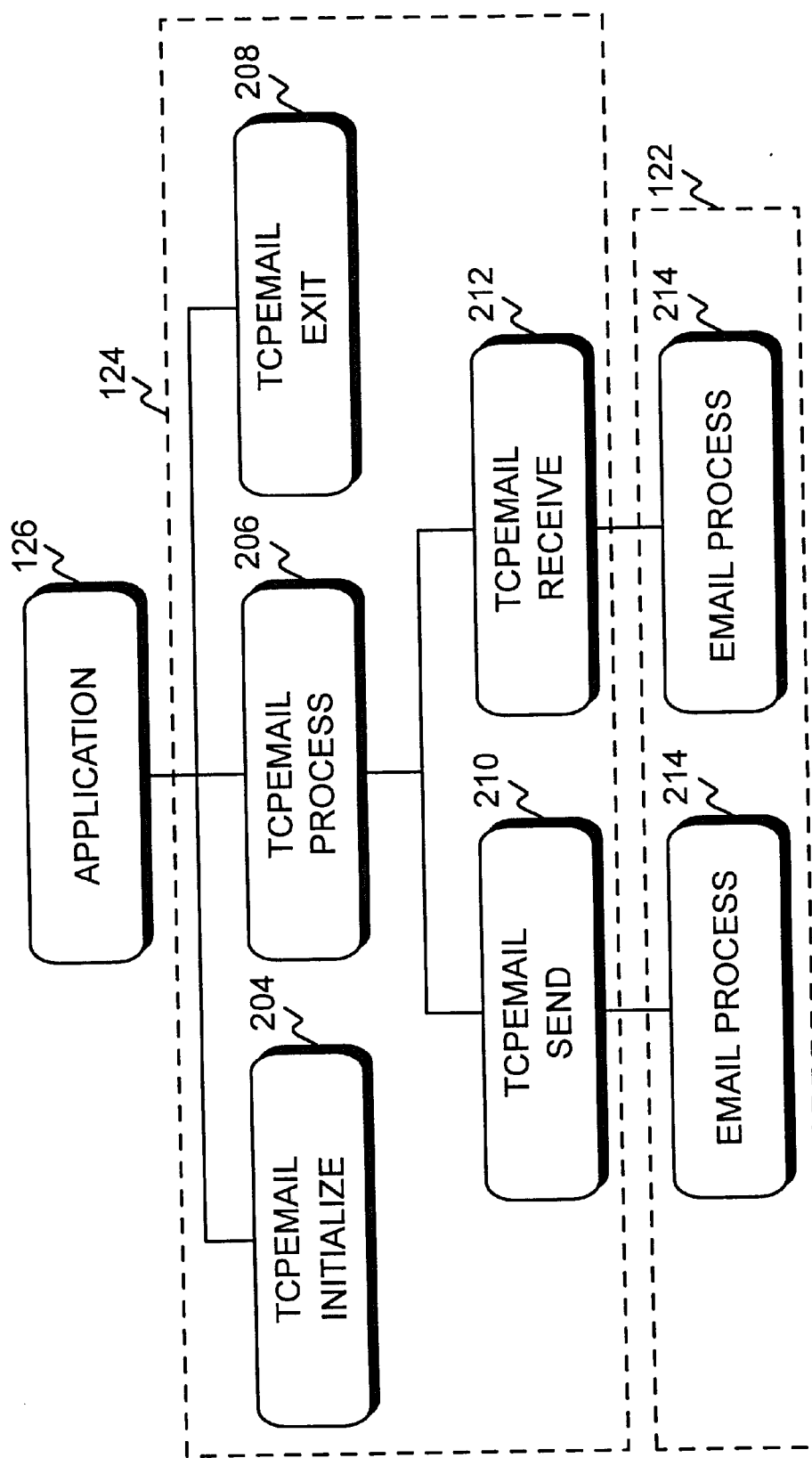
FIG. 2 shows a block diagram of the software of the present invention.

FIG. 2 shows a block diagram of the software of the present invention. Referring now to FIG. 2, the application 126 (also shown in FIG. 1) can use the present invention to communicate to other computer systems by calling the TCPEmail software 124 (also shown in FIG. 1). Within the TCPEmail software 124, a TCP initialize function 204 performs all the initialization necessary to start the communications process between the two computer systems. Each time the application 126 sends or receives data, it calls the TCP process 206 to send or receive the data. The TCP process 206 sub-divides the data into packets that can be sent over the internet. After sub-dividing the data into packets, the TCP process 206 sends each packet to TCPEmail send process 210. The TCPEmail send process 210 converts the data within each packet into an ASCII format, since data within an electronic mail message can only be in ASCII format, and then calls the email software 122 (also shown in FIG. 1) to send the email message to the other computer.

When the email process 122 receives an electronic mail message from the other computer system, it sends the data to the TCPEmail receive process 212 within TCPEmail 124. The TCPEmail receive process 212 separates the data from the e-mail message, converts the data from ASCII to binary format, and then sends the data to the TCP process 206 as a packet. After receiving many packets of data, the TCP process 206 combines these packets and sends the data to the application 126.

After the communications session is complete, the application 126 calls the TCP exit function 208 to free memory, close processes, and terminate the TCPEmail system.

Figure 3:
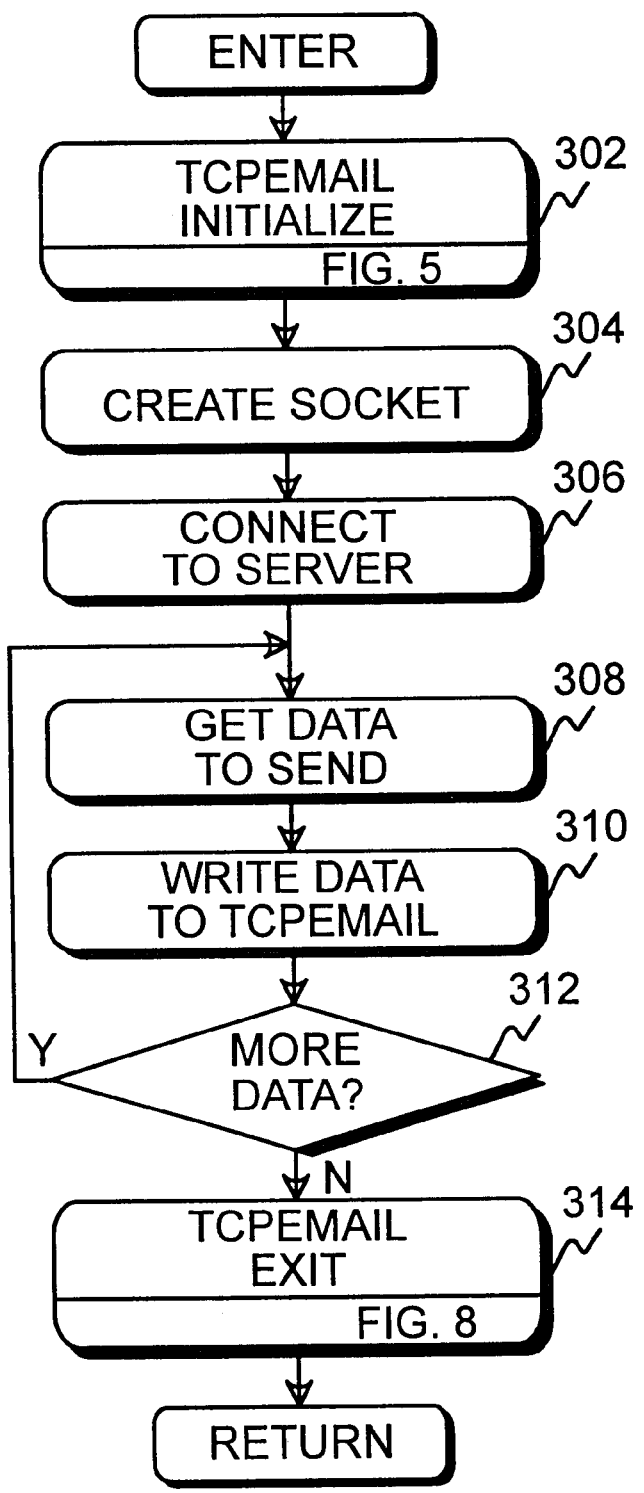
FIG. 3 shows a flowchart of a client process within the present invention.

The present invention is most useful in a client-server environment, wherein a client process needs to exchange data with a server process, typically located on a separate computer system, and typically remotely located wherein the internet can be used for the communications facility between the two machines. FIG. 3 shows an example of the client process within the application 126 (FIG. 1), that would use the TCPEmail invention as described above with respect to FIG. 2. Referring now to FIG. 3, after entry, step 302 calls the TCPEmail initialize process of FIG. 5, as described below, which sets up the TCPEmail system for the communications. Once the system has been initialized, step 304 creates a socket for use in sending and receiving data to the TCPRmail process and thus to the remote server. Step 306 then connects the socket to the remote server. A socket is a conventional interprocess communications system as first shipped in 1982 with the Berkley Software Distribution (BSD) Unix system.

Once a socket has been established for communications to the TCPEmail process, step 308 then gets data to send to the server. In this example, data is only being sent to the server, however, those skilled in the art will recognize that the communications is a bi-directional full duplex process.

Once step 308 gets the data to send, step 310 sends the data to the TCPEmail process, using the socket created in step 304. Step 312 then determines if there are more data to send and if there is, loops back to step 308 to send more data. After all data has been sent to the server, step 312 transfers to step 314 which calls the TCPEmail exit process of FIG. 8 to shut down the TCPEmail system.

Figure 4:
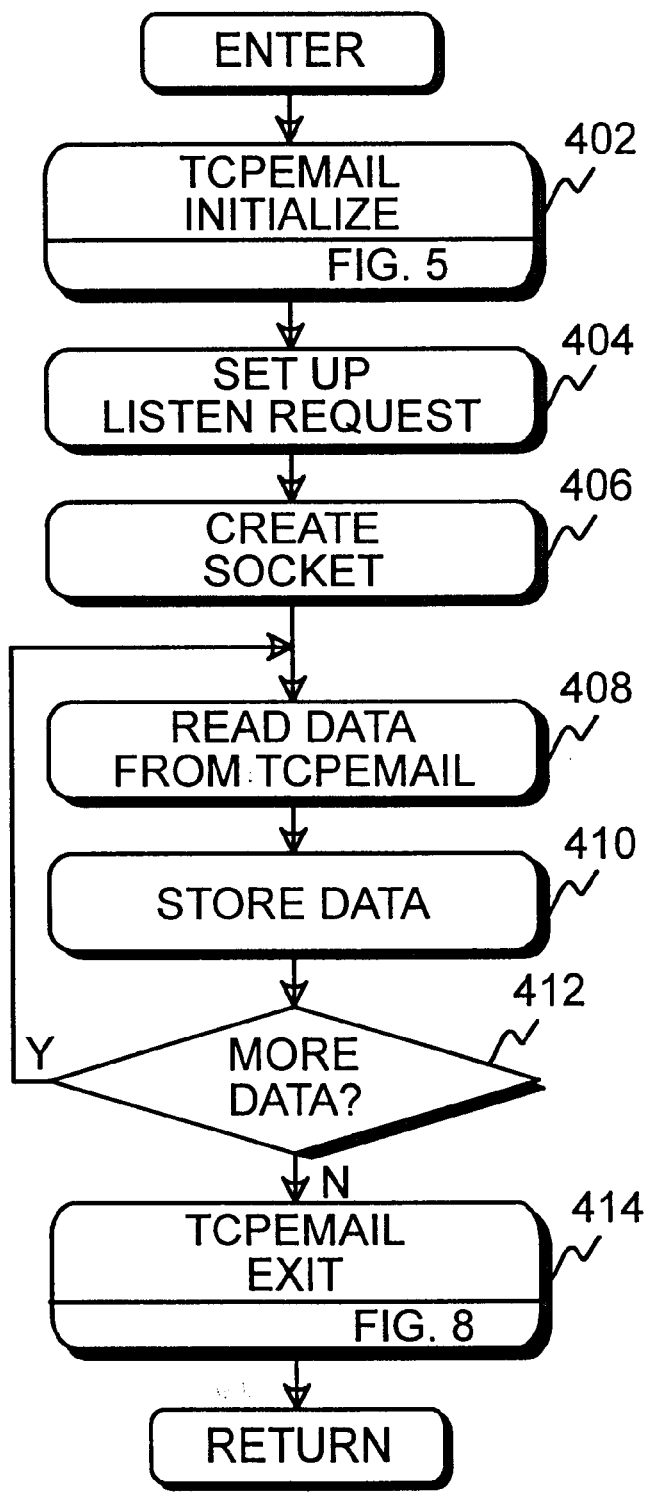
FIG. 4 shows a flowchart of a server process within the present invention.

FIG. 4 shows a flowchart of a server process within the present invention that would receive the data sent by the client process described above with respect to FIG. 3. Referring now to FIG. 4, after entry, step 402 calls the TCPEmail initialize process of FIG. 5. After initializing TCPEmail, step 404 sets up a listen request to allow a remote client to connect to this server process. After a remote client, for example the client process of FIG. 3 described above, connects to this server process, step 406 creates a socket for exchanging data with the TCPEmail process. Once the socket has been created, control goes to step 408 which reads data from the TCPEmail process. After reading the data, step 410 stores the data. Step 412 then determines if there are more data to be received, and if so, step 412 transfers back to step 408 to receive the additional data. Atter all data has been received, step 412 transfers to step 414 which calls the TCPEmail exit process of FIG. 8 to terminate the TCPEmail processing.

Those skilled in the art will recognize that the server described above with respect to FIG. 4 could be programmed to communicate to multiple client processes simultaneously and to exchange bi-directional data with the client process.

Figure 5:
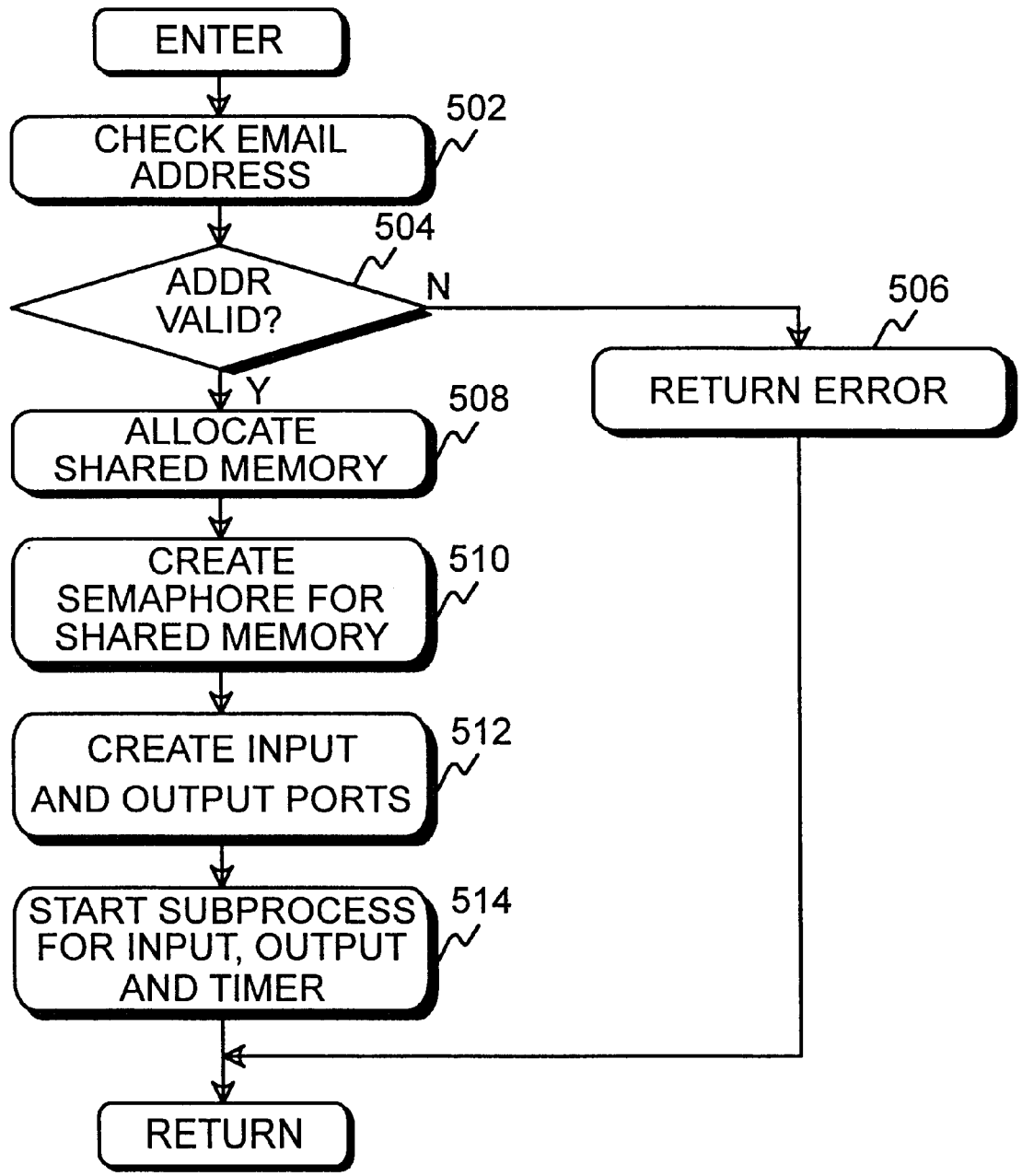
FIG. 5 shows the initialization process of the present invention.

FIG. 5 shows a flowchart of the initialization process 204 of FIG. 2. Referring now to FIG. 5, after entry, step 502 verifies the email address that was passed in from the application 126. If the address is not valid, step 504 transfers to step 506 which returns an error and terminates the process. If the address is valid, step 504 transfers to step 508 which allocates shared memory within the user space of the application program for sharing data within the TCPEmail process. Step 510 then creates semaphores for the shared memory to allow the TCPEmail process to utilize the shared memory without erasing data unintentionally. Step 512 then creates the input and output socket ports for communications between the sub-processes within the TCPEmail system and step 514 starts each of the input and output processes as well as a timer process used to time-out in the case of an acknowledgment not being received when a packet is sent. After establishing all these process FIG. 5 returns to the application so that it can start using the TCPEmail process.

Figure 6:
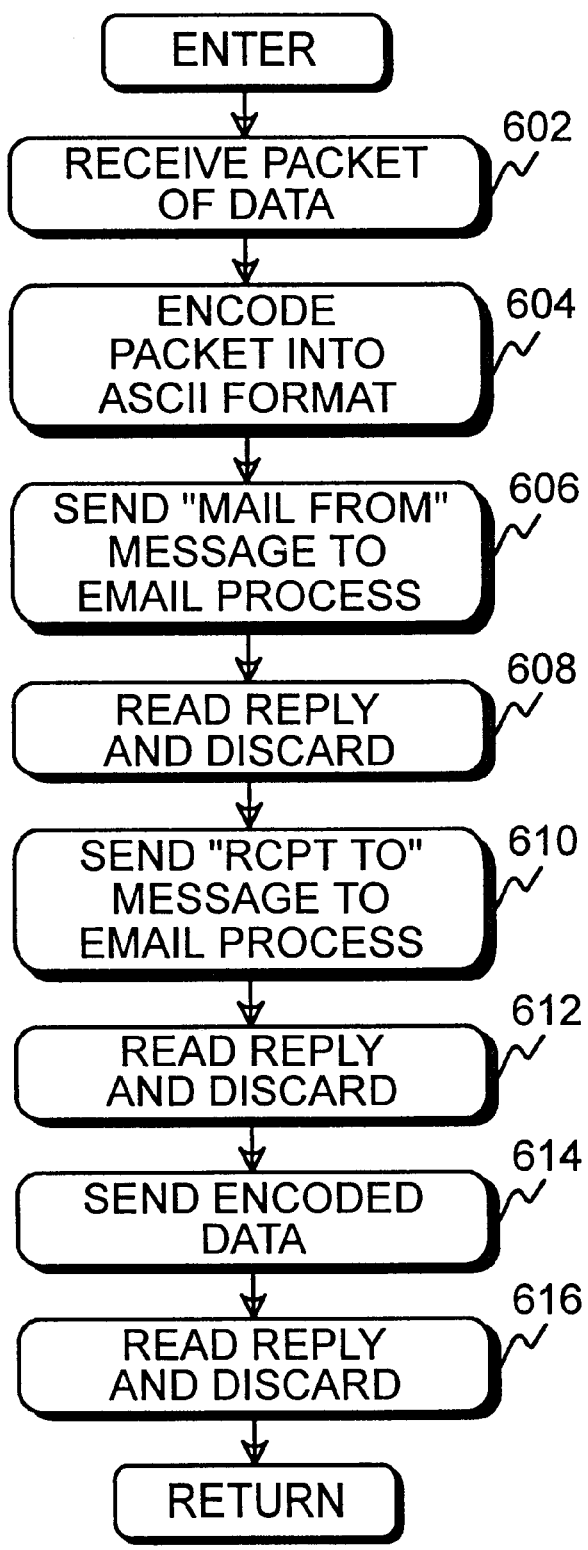
FIG. 6 shows the process of sending data within the present invention.

FIG. 6 shows the TCPEMAIL SEND 210 (FIG. 2) process for sending data packets that is called by the TCPEmail process 206 (FIG. 2). Referring now to FIG. 6, after entry, step 602 receives the packet of data from the TCPEmail process. Step 604 then encodes the data within the packet into an ASCII format. The process of encoding data can be done in many conventional ways, for example, translating each hexadecimal digit of a byte into an ASCII character, for example, translating the hexadecimal digit "A" into the ASCII "A". The present invention encodes the data using the method used by the uuencode function, which is widely available in unix computer systems.

After encoding the data, step 606 sends a "MAIL FROM" message identifying the e-mail address of the sending machine, to the email process. Step 608 reads a reply from the email process, and discards it. Step 610 sends a "RCPT TO" message to the email process identifying the email address to which the packet is to be sent, and then step 612 receives and discards a reply from the email process. Step 614 sends the encoded data to the email process to actually send the email message, and step 616 receives a reply from the email process and discards it. After sending the encoded data, FIG. 6 returns to the TCPEmail process described above.

Figure 7:
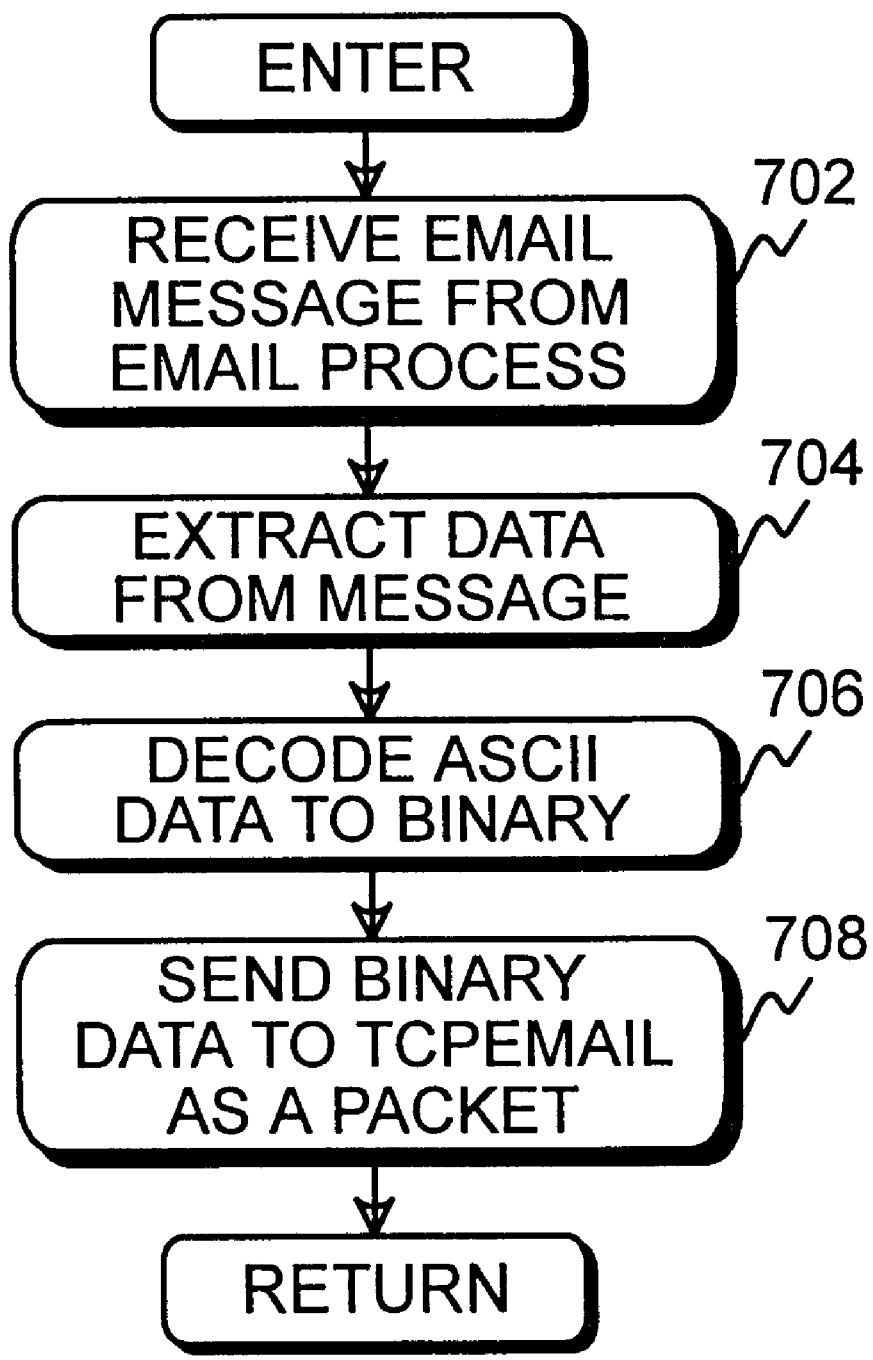
FIG. 7 shows the process of receiving data within the present invention.

FIG. 7 shows a flowchart of the TCPEMAIL RECEIVE 212 (FIG. 2) process for receiving data from the email system. Referring now to FIG. 7, after entry, step 702 receives an email message from the email process 122 (FIG. 1). Step 704 separates the data contained within the email message from the addressing information and step 706 decodes the data from ASCII data back into a binary format, reversing the process described above with respect to step 604 of FIG. 6. The present invention uses the method found un the uudecode function, which is widely available in unix computer systems.

Step 708 then sends the binary data to the TCPEmail process as a received packet of data. After sending the data to the TCPEmail process, FIG. 7 returns.

The email process used by FIGS. 6 and 7 of the present invention is the sendmail daemon in the unix operating system. Further, the protocol described above is the protocol of the Simple Mail Transfer Protocol (SMTP) used with sendmail in unix. Those skilled in the art will recognize that other electronic mail systems could be used in place of SMTP and sendmail.

In the present invention, the functions of FIG. 6 and FIG. 7 are implemented as separate, parallel, processes within the user address space. Each time a packet is received, the process of FIG. 7 is started and after it processes the data, and sends the packet to the TCPEmail process, the process of FIG. 7 terminates itself.

Figure 8:
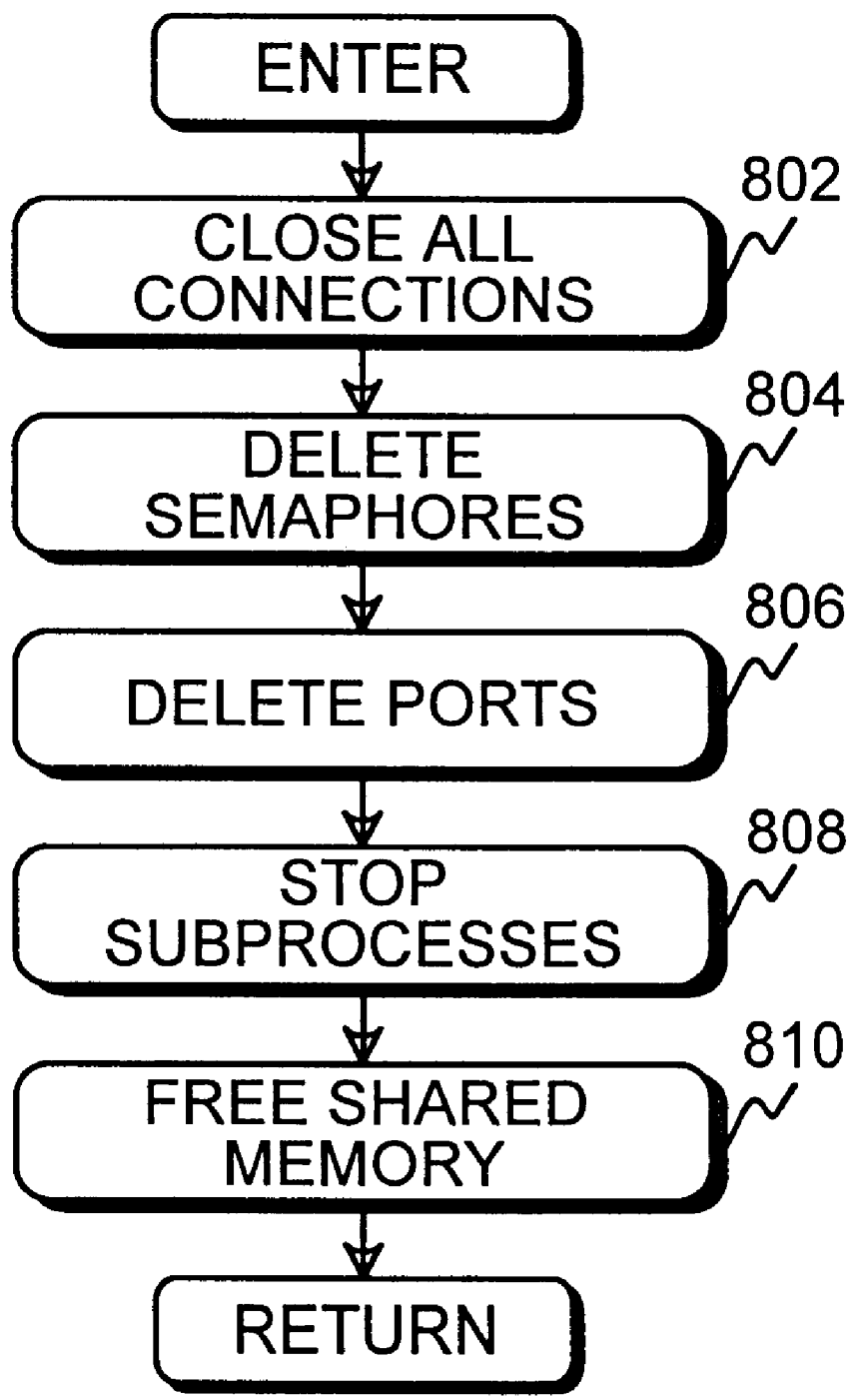
FIG. 8 shows the termination process of the present invention.

FIG. 9 shows the TCPEmail exit process of step 208 (FIG. 2). Referring now to FIG. 8, after entry, step 802 closes all connections between the processes, and step 804 deletes all the semaphores that are used to communicate between the processes. Step 806 then deletes the ports used to send data between the processes and step 808 stops all of the sub-processes. Step 810 then frees the shared memory used by the TCPEmail process and returns to the application 126.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for exchanging data records using a TCP/IP protocol between a first process in a first computer and a second process in a second computer, said method comprising the steps of:

(a) receiving a send data record from the first process;

(b) subdividing the send data record into one or more send data packets within a TCP portion of the TCP/IP protocol;

(c) enclosing each send data packet from step (b) into an electronic mail message within an IP portion of the TCP/IP protocol;

(d) sending the electronic mail message from the first computer to the second computer using conventional electronic mail functions;

(e) receiving the electronic mail message in the second computer using conventional electronic mail functions;

(f) removing the data from the electronic mail message to form a receive data packet within the IP portion of the TCP/IP protocol;

(g) combining the receive data packet from one or more electronic mail messages into a receive data record within the TCP portion of the TCP/IP protocol; and (h) sending the receive data record to the second process.

2. The method of claim 1 wherein step (c) further comprises the following step (c1), and wherein step (f) further comprises the following step (f1):

(c1) converting data of the send data packet from a binary format into an ASCII format; and (f1) converting the data of the receive data packet from an ASCII format to a binary format.

3. The method of claim 1 wherein the electronic mail send and receive in steps (d) and (e) is sent using a second TCP/IP protocol.

4. The method of claim 1 wherein step (d) further comprises the steps of:

(d1) sending an address of the first computer to a mail server process;

(d2) receiving a reply from the mail server process;

(d3) sending an address of the second computer to a mail server process;

(d4) receiving a reply from the mail server process;

(d5) sending the send data packet to the mail server process; and (d6) receiving a reply from the mail server process.

5. The method of claim 4 wherein each reply from the mail server process is ignored.

6. The method of claim 1 wherein all steps of the method are performed within a user address space of each of the first and second computer systems.

7. A method for exchanging data records using a TCP/IP protocol between a first process in a first computer and a second process in a second computer, said method comprising the steps of:

(a) receiving a send data record from the first process;

(b) subdividing the send data record into at least one send data packet within a TCP portion of the TCP/IP protocol;

(c) converting data of each send data packet from step (b) from a binary format into an ASCII format;

(d) enclosing each converted send data packet from step (c) into an electronic mail message within an IP portion of the TCP/IP protocol;

(e) sending the electronic mail message from the first computer to the second computer using conventional electronic mail functions;

(f) receiving the electronic mail message in the second computer using conventional electronic mail functions;

(g) removing the data from the electronic mail message;

(h) converting the data removed in step (g) from an ASCII format to a binary format to form a receive data packet within the IP portion of the TCP/IP protocol;

(i) combining the receive data packet from one or more electronic mail messages into a receive data record within the TCP portion of the TCP/IP protocol; and (j) sending the receive data record to the second process.

8. The method of claim 7 wherein the electronic mail send and receive in steps (e) and (f) is sent using a second TCP/IP protocol.

9. The method of claim 7 wherein step (e) further comprises the steps of:

(e1) sending an address of the first computer to a mail server process;

(e2) receiving a reply from the mail server process;

(e3) sending an address of the second computer to a mail server process;

(e4) receiving a reply from the mail server process;

(e5) sending the send data packet to the mail server process; and (e6) receiving a reply from the mail server process.

10. The method of claim 9 wherein each reply from the mail server process is ignored.

11. The method of claim 7 wherein all steps of the method are performed within a user address space of each of the first and second computer systems.

12. A system for exchanging data records using a TCP/IP protocol between a first process in a first computer and a second process in a second computer, said method comprising:

means for receiving a send data record from the first process;

means for subdividing the send data record into one or more send data packets within a TCP portion of the TCP/IP protocol;

means for enclosing each send data packet into an electronic mail message within an IP portion of the TCP/IP protocol;

means for sending the electronic mail message from the first computer to the second computer using conventional electronic mail means;

means for receiving the electronic mail message in the second computer using conventional electronic mail means;

means for removing the data from the electronic mail message to form a receive data packet within the IP portion of the TCP/IP protocol;

means for combining the receive data packet from one or more electronic mail messages into a receive data record within the TCP portion of the TCP/IP protocol; and means for sending the receive data record to the second process.

13. The system of claim 12 further comprising:

means for converting data of the send data packet from a binary format into an ASCII format and means for converting the data of the receive data packet from an ASCII format to a binary format.

14. The method of claim 12 wherein the means for sending further comprises:

means for sending an address of the first computer to a mail server process means;

means for receiving a reply from the mail server process means;

means for sending an address of the second computer to a mail server process means;

means for receiving a reply from the mail server process means;

means for sending the send data packet to the mail server process means; and means receiving a reply from the mail server process means.

15. The system of claim 14 wherein each reply from the mail server process is ignored.

* * * * *